United States Patent [19]

Castle

[11] Patent Number: 5,328,152
[45] Date of Patent: Jul. 12, 1994

[54] FLUID CONTROL VALVE UNIT

[75] Inventor: Steven T. Castle, Tahoe, Calif.

[73] Assignee: Bruce Industries, Inc., Dayton, Nev.

[21] Appl. No.: 905,911

[22] Filed: Jun. 29, 1992

[51] Int. Cl.$^5$ ............... F16K 31/528; B60H 1/34
[52] U.S. Cl. .................................... 251/229; 74/25;
74/57; 74/89; 251/252; 251/339; 251/349;
454/76; 454/286; 454/334
[58] Field of Search ............ 251/229, 252, 266, 339,
251/346, 351, 347, 349, 353; 454/76, 286, 333,
334; 74/23, 25, 56, 57, 89

[56] References Cited

U.S. PATENT DOCUMENTS

| | | | |
|---|---|---|---|
| 614,517 | 11/1898 | Taylor | 251/252 |
| 858,771 | 7/1907 | Whitehouse | 251/252 |
| 1,879,320 | 9/1932 | Klett | 251/252 |
| 2,179,165 | 11/1939 | Sifkovitz | 251/252 |
| 2,516,805 | 7/1950 | Rother et al. | 454/76 |
| 2,642,256 | 6/1953 | Stehlin | 251/252 |
| 3,014,688 | 12/1961 | McCollum | 251/252 |
| 3,113,502 | 12/1963 | Kallel et al. | 454/76 |
| 3,542,492 | 11/1970 | Muella | 454/76 |
| 3,780,980 | 12/1973 | Kallel | 251/252 |
| 4,716,818 | 1/1988 | Brown | 251/252 |
| 5,127,876 | 7/1992 | Howe et al. | 454/286 |

Primary Examiner—George L. Walton
Attorney, Agent, or Firm—Beehler & Pavitt

[57] ABSTRACT

A fluid control valve unit particularly suited to be used as an air control valve in an overhead passenger service unit for aircraft, buses, trains and the like. This valve unit includes a non-rotatable and axially movable closure member which moves in response to rotation of an axially non-movable actuator member supported in a universally pivotable and tiltable housing. This valve has relatively few component parts and is thus easy to manufacture and assemble. A helical groove on the actuator member cooperates in a cam-like manner with a projection on the closure member to create the desired translation.

20 Claims, 2 Drawing Sheets

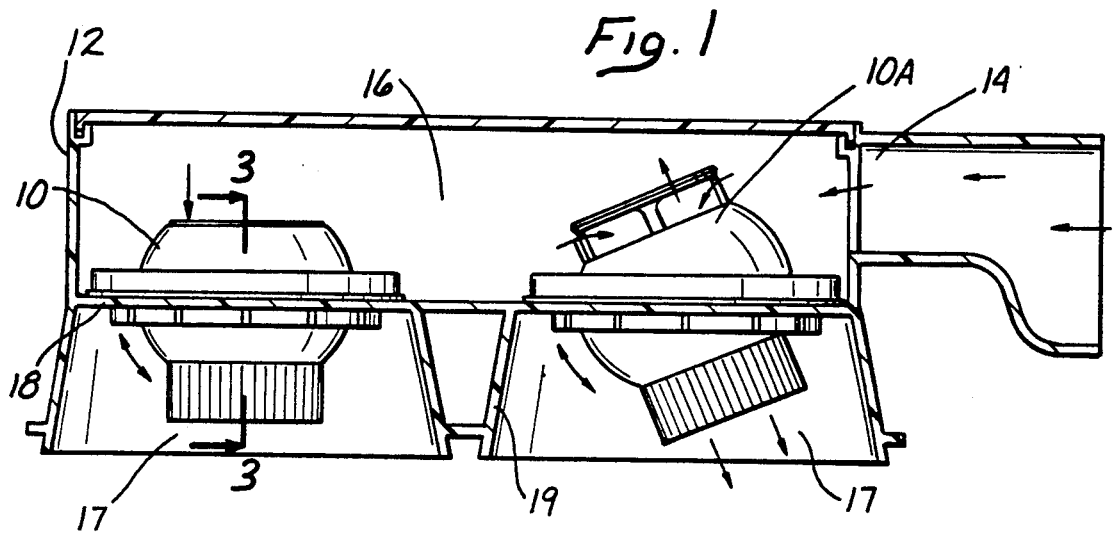
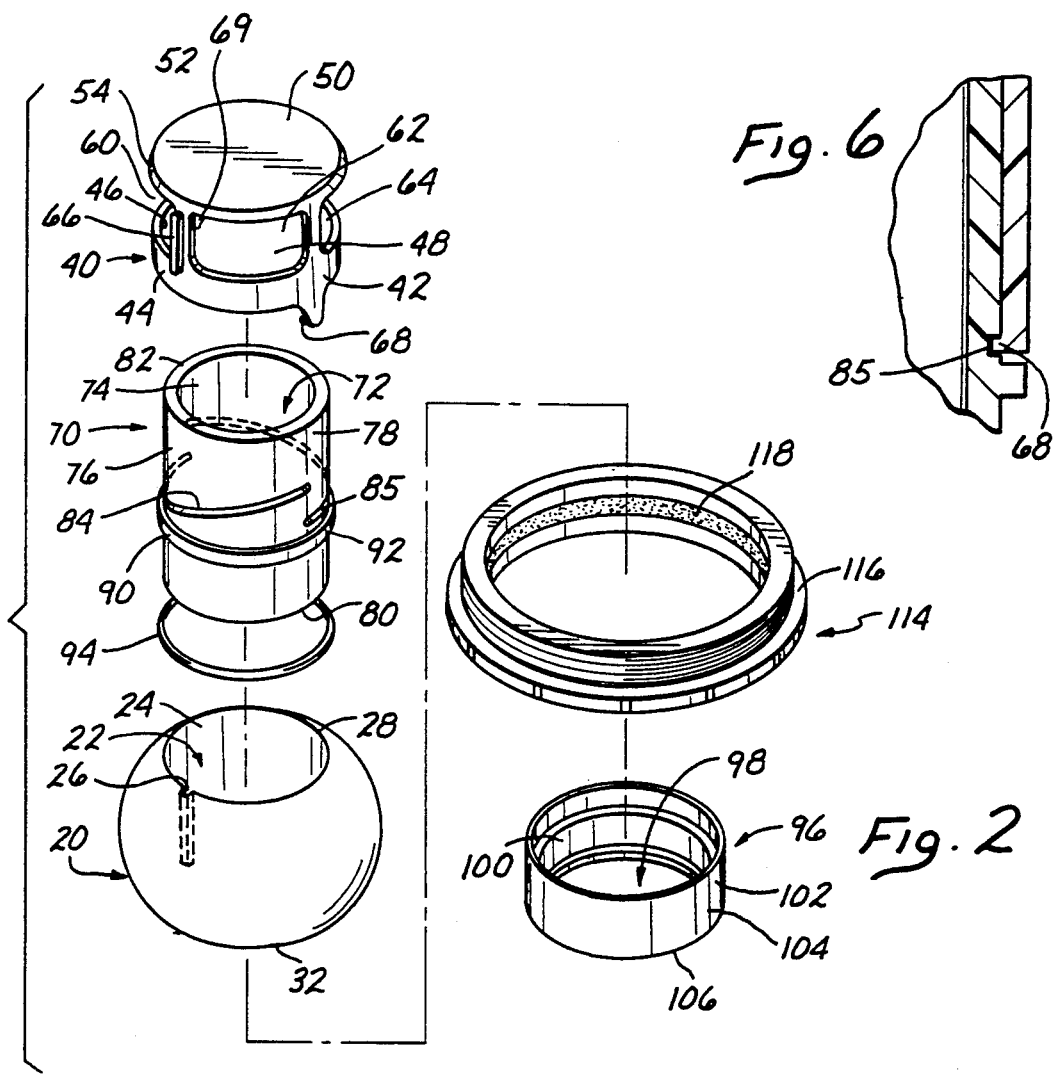

FLUID CONTROL VALVE UNIT

FIELD OF THE INVENTION

This invention relates generally to fluid control valves and more specifically to an improved air control valve preferably used, but not limited to use as a part of a passenger service unit for aircraft, buses, trains and the like, wherein the discharge rate and direction of air discharge may be controlled manually.

RELATED APPLICATION

This application is related to the subject matter of Ser. No. 07/721,824 filed on Jun. 26, 1991 and assigned to the same Assignee and now U.S. Pat. No. 5,127,876, granted Jul. 7, 1992.

BACKGROUND OF THE INVENTION

A passenger service unit (PSU) is a unit that is typically located overhead of each passenger in an aircraft, bus, or train, the PSU normally including lighting, call button and an air control valve. The air control valve normally consists of a valve device which controls the rate and direction of airflow into the passenger cabin and in the region of the passenger for providing essentially personal control of air. These air control valves are well-known in the art and normally include a universally pivotable ball-type assembly for controlling the amount and directing the flow of air through the valve in the direction set by the passenger, or other person in the case of a control valve used other than in a PSU.

THE PRIOR ART

Air control valves themselves are well known, see for example, U.S. Pat. No. 4,716,818 to Brown; U.S. Pat. No. 2,596,909 to Mufich, et al.; U.S. Pat. No. 2,462,989 to Mufich, et al.; U.S. Pat. No. 3,690,244 to Kallel, et al.; U.S. Pat. No. 3,835,759 to Lloyd; U.S. Pat. No. 2,885,943 to Divizia; U.S. Pat: No. 3,113,502 to Kallel, et al.; U.S. Pat. No. 2,189,502 to Johnston; U.S. Pat. No. 2,974,580 to Zimmerman, et al.; U.S. Pat. No. 4,524,679 to Lyons; U.S. Pat. No. 3,366,363 to Hogan, et al.

The Divizia patent relates to a ventilating apparatus which includes a collar and actuator which rotate but which do not translate, i.e., move axially. A cylindrical closure member is keyed to the actuator and rotates with the actuator, but also translates because of a set screw which rides in a helical groove. To seal, the cylindrical closure member rotates and translates upward, closing against a conical plug on the inner surface of the closure member and against an upper sealing ring on the outer surface of the closure member and between the housing. A venturi effect is described in Divizia most likely resulting from a constrained air passage. The higher air velocity tend to be more noisy. The venturi effect is asserted to be an advantage enabling the air stream to be more readily directed. The Divizia unit is more complex than that of this invention. The screws used require adjustment and requires more time to assemble than does the unit of this invention.

Most of the prior expedients provide a rotatable adjustable knob in the passenger's cabin for adjusting the degree of airflow through the valve.

One of the problems which has not been solved by these prior expedients is air leakage when the system is supposedly closed. Air leakage tends to cause a whistling noise and results in unwanted cold air tending to come down on the passenger. This problem presents itself in prior expedients which require the upward movement of a closure member to create a seal which prevents airflow through the device. The force of gravity and the pressure from the manifold air counteracts the closure of such devices and results in the unwanted air leakage.

Yet another problem of these prior expedients is restricted airflow when the device is supposedly completely open. It is important to have a wide range of flow from completely closed to completely open, to provide the passenger with the highest degree of comfort and choice.

Yet another problem with the prior expedients are the complex designs which require numerous component parts. The more parts required results in greater manufacturing and assembly costs and more opportunity for each part to fail during assembly or operation of the device.

Yet another problem of the prior expedients is the complexity of designs which require each individual component part to have very small tolerances to ensure the fit and operability of each part relative to its surrounding and mating parts.

Yet another problem with the prior expedients is the difficulty, and the resultant increase of time, required for assembly. If a design is complex and includes numerous components, the cost of assembly and the opportunity for error during assembly is substantially increased. In addition, many of the prior expedients require adjustments during, and subsequent to, assembly.

Yet another problem with the prior expedients is the additional cost of maintenance and repair which is required with any device with many component parts that are subject to failure and degradation during operation. Particularly troublesome are component parts, such as O-rings or seals, which are easily worn out with use. Component parts which are easily worn out should be limited, if possible, in such devices.

An ideal fluid control valve would provide an easy rotating adjustment for the passenger, a wide range of airflow to choose from, a closed position which provides a positive seal with no leakage, a fully open position which provides maximum airflow with minimum constriction, as few component parts as possible, and no need for adjustments. Equally important is a design which provides component parts which are inexpensive to manufacture and simple and relatively inexpensive to assemble.

SUMMARY OF THE INVENTION

This invention relates to a fluid or air control valve and, more particularly, to an air control valve unit for variably controlling the discharge of air from an air source which comprises a housing having a cavity extending therethrough, a rotatably and nonaxially movable actuator member supported in one end of the cavity of the housing, and a closure member adapted to move axially and nonrotatably in and out of the other end of the cavity of the housing in response to rotation of the actuator member.

The housing is preferably in the general shape of a sphere. The housing is thereby of the type which can be universally pivotable when mounted in a wall of air manifold. The housing can be a single part or it may be two or more parts to provide easy assembly.

The cavity is preferably a cylindrical bore which extends axially through the housing. The closure member is preferably in the shape of a tubular side wall with a cap portion formed on one end. The tubular side wall has at least one aperture, or air window, and preferably three windows, through which air can flow from the high pressure end of the housing through to the low pressure end of the housing. The outer diameter of the tubular side wall is slightly smaller than the inner diameter of the cylindrical housing cavity whereby the closure member is adapted to closely fit within and be axially movable within the cylindrical housing cavity.

The closure member includes sealing means for engagement with the housing to prevent flow of air therethrough. The sealing means are preferably integral with the cap portion of the closure member. This cap portion may be any shape, but is preferably flat. The cap extends radially outward beyond the circumference of the side wall defining a flange which is adapted to rest upon and create an airtight seal with the high pressure end of the housing. When the closure member is moved axially such that the airtight seal is created between the flange and the housing, the closure member is in the closed position. As the closure member is moved axially from its closed position away from the housing, more of the air window(s) is exposed and a correspondingly greater amount of air is allowed to flow therethrough.

Means are provided to prevent the closure member from being rotated about its own axis within the cylindrical cavity. A preferred means for preventing the rotation of the closure member comprises at least one projection element being fixed or integrally formed on the outside of the tubular wall of the closure member. This projection element extends outwardly therefrom and is preferably longitudinally aligned parallel to the axis of the cylindrical cavity. Receiving means, preferably a slot similarly aligned parallel to the axis of the cylindrical cavity is provided on the inside wall of the housing. The housing slot is adapted to allow the projection element to slide freely along an axis parallel to the longitudinal axis of the cavity and further adapted to prevent the projection element from rotating with respect to the cavity.

The closure member further includes an actuation portion which is adapted to effect the axial movement of the closure member within the housing cavity in response to rotative movement of an actuator member. The actuation portion preferably includes at least one finger or projection element fixed, preferably integrally, to the closure member wall and extending inwardly therefrom. This finger element(s) is adapted to engage a cam portion of the actuator member as will be discussed below.

The actuator member comprises a single part. The actuator member is in fluid communication with the closure member and is received for progressive rotating and nonaxial movement in the housing cavity. One end of the actuator member extends out of the housing and into the passenger cabin. This end is preferably provided with an adjustment knob, or nosepiece, for use by a passenger. The adjustment knob is fixed to the end of the closure member and also assists in preventing axial movement of the closure member due to contact between the adjustment knob and the discharge end of the housing.

The actuator member is preferably a tubular side wall. The outside of the actuator wall is provided with cam means which preferably include at least one helical cam channel or groove. Each cam channel is preferably 180 degrees in circumferential length. The axial length between each end of the cam channel should be sufficient to allow the apertures on the closure member to be fully opened upon axial movement of the closure member.

The closure finger(s) are adapted to be closely received and slidably engaged within the helical cam channel(s). Upon rotation of the actuator member, the helical cam channel engages the closure finger to effect progressive axial movement of the closure member to permit flow of an amount of fluid related to the location of the windows relative to the housing.

Means are further preferably provided for preventing the axial movement of the actuator member within the housing cavity. These axial movement preventing means are preferably provided by an outwardly extending radial actuator flange being fixed, preferably integrally, to the outer wall of the actuator member. This actuator flange is adapted to mate with an inwardly extending radial housing flange that conforms to the shape of the lower surface of the actuator flange. The top surface of the housing flange is adapted to tightly mate with the lower surface of the actuator flange preventing axial movement of the actuator member towards the discharge side of the housing. Axial movement of the actuator member in the other direction is prevented by the fixation of the adjustment knob to the end of the actuator member which protrudes from the discharge side of the housing.

A tight seal is provided between the actuator flange and the housing flange by placement of an annular ring seal, preferably a flat gasket seal, therebetween.

When a user of the control valve unit rotates the adjustment knob, the actuator member fixed thereto is necessarily similarly rotated. As the actuator member, and the helical cam channels thereon, is rotated, the closure member is moved axially out of the high pressure end of the housing responsive to communication between the inwardly directed closure fingers within the helical cam channels.

While the specification concludes with claims particularly pointing out and distinctly claiming the subject matter which is regarded as the invention, it is believed that the invention, the objects and features Of the invention, and further objects and features and advantages thereof will be better understood from the following description taken in connection with the accompanying drawings.

BRIEF DESCRIPTION OF THE DRAWINGS

FIG. 1 is a view partly in section and partly in elevation of two adjacent air control units in a passenger service unit in accordance with this invention;

FIG. 2 is an exploded view of the fluid control valve of this invention;

FIG. 6 is a cross-sectional view, taken along the line 6—6 of FIG. 4, of the fluid control valve of the present invention.

DETAILED DESCRIPTION OF THE PREFERRED EMBODIMENT

Figure 3:
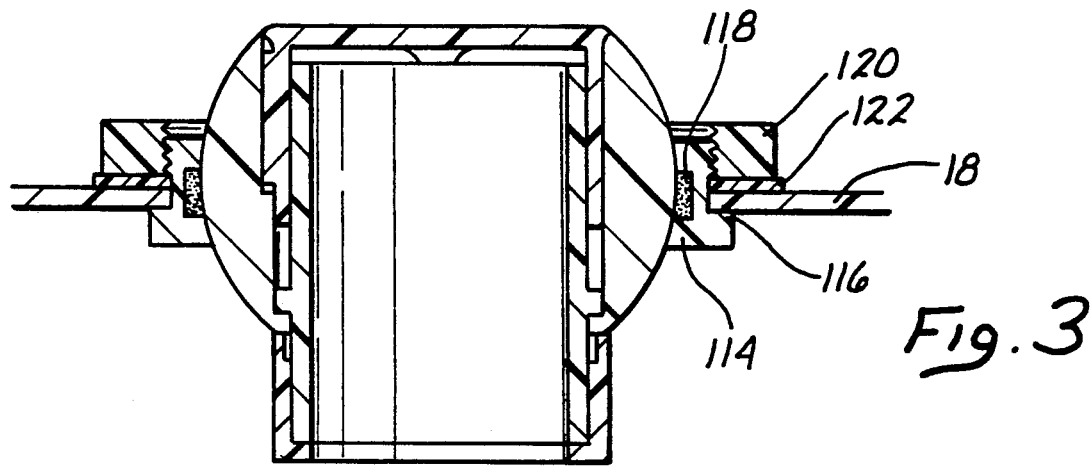
FIG. 3 is a cross-sectional view, taken along the line 3—3 of FIG. 1, of the fluid control valve of the present invention in the closed position.

Referring to the drawings which illustrate preferred forms of the present invention, two fluid control valves, shown as air control valve units 10 and 10A, are illustrated in FIG. 1 mounted adjacent one another in an air supply manifold assembly 12. For purposes of explanation, one valve 10A is illustrated in the full open position and angularly oriented, while the other, 10, is illustrated in the fully closed position and aligned in a generally vertical orientation, i.e., not angularly pivoted with respect to the manifold assembly 12. While the control valves are illustrated adjacent to each other, they may be spaced from each other by devices such as lights or control buttons therebetween, or may be located in a separate air supply manifold.

In the form illustrated, the manifold assembly 12 receives air, usually cooled air from a cooled air source, and has an inlet 14 for providing a continuous flow of air into a sealed inlet air chamber 16 in the manifold 12. The term "sealed" is used in the context that manifold air cannot exit the manifold except through the valves 10 and 10A. Generally, the pressure of the air in the manifold is slightly higher than the air pressure on the discharge side. The manifold 12 and the individual air control valve units 10 and 10A separate an incoming air flow area 16 from the discharge area 17 which is basically the output side of the individual air control valves. The manifold 12 can be adapted to support any number of air control units 10 and 10A, and may be located in a PSU that houses the electronic components and other equipment to provide lighting, a call button, or other passenger conveniences. The manifold 12 can be designed in any shape or manufactured of any material which is comparable to those currently being used to accommodate such passenger conveniences.

As shown, the valves 10 and 10A are mounted and sealed in a lower wall section 18 of the manifold assembly, the latter preferably including depending side walls 19 which form both separators and deflectors for the air discharged by the air control valves. For mounting in aircraft and the like, connecting side walls 19A and side wall elements 19B are optionally provided.

Each of air control valves 10 and 10A is of the same basic structure and is comprised of the individual components in accordance with this invention as illustrated in detail in FIGS. 2 through 6.

As shown in FIG. 2, the basic components of each air control valve unit include housing 20, closure member 40, actuator 70, flat gasket seal 94, adjustment collar 96, and mounting element 114.

Housing 20 is preferably generally spherical and universally pivotable. Such pivotable and generally spherical housings are common in air control valves in the passenger service unit in most aircraft as they provide the user with a means by which the airflow can be directed in various directions as the user desires.

Turning now to FIGS. 2 through 5, housing 20 contains a cylindrical housing cavity 22 which is defined by inside housing wall 24. Housing cavity 22 extends longitudinally from air input side 28 to air discharge side 32. Housing cavity 22 is preferably located on the center axis of the spherical housing 20 to provide equal pivoting movement in all directions. Housing 20 is mounted in manifold 12, as shown in FIG. 1 such that the air input end 28 is located in the high pressure area 16 and the air discharge end 32 is situated in the low pressure area 17.

Inside housing wall 24 is provided with an axially extending slot 26 which is adapted to receive a projection portion of closure member 40 as will be discussed below. Slot 26 is preferably aligned parallel to the axis of housing cavity 22. The interaction between Slot 26 and a projection portion of closure member 40 is adapted to prevent rotative movement of closure member 40 relative to housing 20, as, once again, will be explained below.

Figure 5:
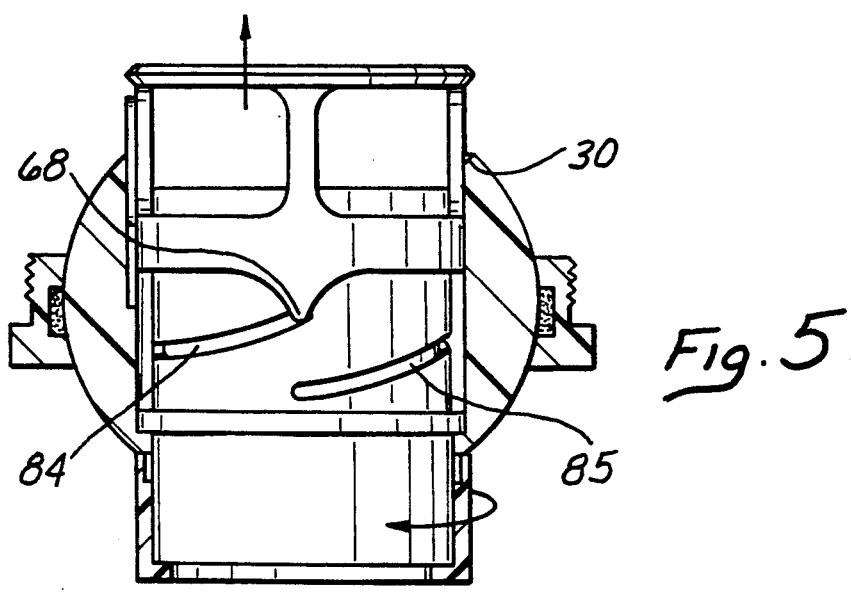
FIG. 5 is a view partly in cross-section and partly in elevation similar to FIG. 4 illustrating the open position of the fluid control valve in accordance with the present invention.

Air input side 28 is provided with tapered wall 30, as shown in FIG. 5, which is adapted to allow closure member 40 to seat thereon, as will be discussed below.

Figure 4:
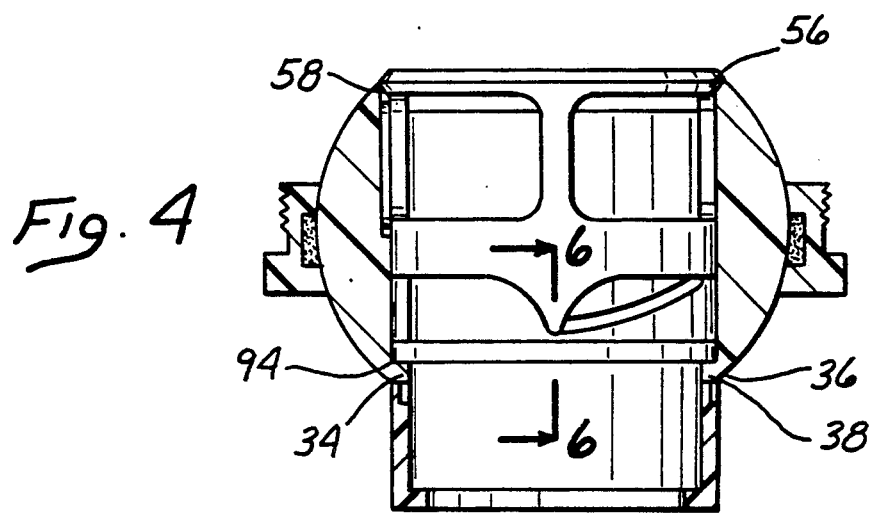
FIG. 4 is a view partly in cross-section and partly in elevation of the fluid control valve of the present invention in the closed position.

The air discharge side 32 is provided with an inwardly directed radial projection or shoulder 34, as shown in cross section in FIG. 4, defining a reduced housing radius 34. This reduced housing radius 34 is adapted to prevent the actuator 70 from passing through the housing cavity 22 by providing contact between a radially extended midportion 90 of actuator 70 with the input surface 36 of inward projection 34. The mating of shoulder 34 with midportion 90 also provides a seal adapted to prevent the flow of fluid therethrough. This seal is supplemented by the placement of flat gasket seal 94 therein.

Similarly, adjustment collar 96 is adapted to contact the discharge surface 38 of inward projection 34, thereby providing a tight fit fixing adjustment collar 96 to actuator 70.

Closure member 40 includes a cylindrical closure cavity 48 which is defined by the inside surface 46 of tubular closure wall 42. Outside surface 44 of tubular closure wall 42 is adapted to be closely received within housing cavity 22.

Cap portion 50 is preferably integrally formed with closure wall 42. The circumferential portion 52 of cap 50 includes a radially extending peripheral flange 54 whose function is to provide a positive airtight seal with the tapered wall 30 at the air input side 28 of housing 20 when closure member 40 is in a closed position, as indicated by valve 10 in FIG. 1 and further indicated in FIGS. 3 and 4. To this end, flange 54 includes a radially extending lip 56, see FIGS. 3 and 4, which overlies the circular air input end 28 of housing 20, there being provided a diverging tapered wall 58 between the outside surface of the closure member and lip 56. This tapered wall 58 assists in providing an effective seal between the closure member and the housing in the closed position.

The outer diameter of closure wall 42 and the inside diameter of housing wall 24 are proportioned to provide a close fit by which closure wall 42 can be fit into housing cavity 22 and be axially movable therein. In addition to forming a tight seal, flange 54 prevents closure member 40 from sliding all the way through the housing cavity 22. Closure wall 42 is axially aligned within housing cavity 22 and, when closure member 40 is in its closed position, there is no airflow through housing cavity 22.

Closure wall 42 has a plurality of circumferentially spaced apart and axially extending air openings, or windows, three of which are shown as windows 60, 62 and 64 in FIGS. 2, 4 and 5. Although the embodiment shown in the figures contemplates four such windows, any reasonable number may be used to permit flow of air into the housing cavity when the valve is in the open position. The windows should be of such length, height and number to allow the maximum amount of airflow to flow into housing cavity 22 when closure member 40 is in the open position. Each of windows 60, 62, and 64 provides an opening through which air is allowed to travel from high pressure area 16 through housing cavity 22 and into low pressure area 17 when closure member 40 is in an open position, which is whenever flange 54 is not providing an airtight seal with air input side 28 of housing 20. Since closure member 40 is axially movable in an essentially infinite range of adjustments between the full open and closed position, the amount of air flowing into housing cavity 22, and thus to the low pressure or discharge side 17, is directly related to the axial length of windows 60, 62 and 64, which is open, i.e., that portion of the windows above air input side 28 of housing 20, as seen with respect to valve 10A in FIG. 1.

Outside surface 44 of closure 42 is provided with projection 66, which is adapted to be received within slot 26. Projection 66 is preferably aligned parallel to the axis of closure cavity 48, and therefore necessarily aligned parallel to slot 26 when closure member 40 is assembled within housing 20. During assembly, projection 66 is inserted within slot 26, thereby allowing the required axial movement of closure member 40 within housing 20, but preventing rotative movement of closure member 40 with respect to housing 20. The importance of this restriction of rotative movement of closure member 40 will be readily apparent as the resulting beneficial axial movement is explained below. This axial movement results from the interaction between inwardly directed radial projections 68 and 69 of closure member 40 and the helical grooves 84 and 85 of actuator 70.

Projections 68 and 69 extend from inside surface 46 of closure wall 42 towards the axis of closure cavity. These projections 68 and 69 are adapted to ride within the tracks provided by helical groove 84 and 85 of actuator 70.

Nozzle or actuator 70 includes a cylindrical actuator cavity 72 which is defined by the inside surface 74 of tubular actuator wall 76. When assembled, actuator cavity 70 is axially aligned with closure cavity 48 and housing cavity 22. The diameter of actuator wall 76 is such that outside surface 78 is adapted to fit easily within closure wall 42. When assembled, discharge end 80 of actuator 70 is directed towards low pressure area 17 and input end 82 is directed towards high pressure area 16.

Helical cam channels 84 and 85 are disposed on the outside surface 78 of actuator wall 76. Each of helical grooves 84 and 85 circumferentially extend approximately 180 degrees along outside surface 78. Helical channel 84 does not axially overlap helical groove 85, i.e., groove 84 is on the opposite side of the outside surface 78 from groove 85. Each of channels 84 and 85 has an axial length which is adapted to allow the maximum exposure of windows 60, 62, and 64 to airflow in high pressure area 16 when closure member 40 is in the open position.

Channels 84 and 85 are adapted to receive therein projections 68 and 69, respectively. As actuator 70 is rotated, as will be explained below, the interaction of projections 68 and 69 within channels 84 and 85 force the axial movement of closure member 40 towards either the open or closed position depending upon the direction of rotation of actuator 70.

Outside surface 78 is further provided with a radially extended midportion 90 whose outside diameter is adapted to closely fit within housing cavity 22. Shoulder surface 92 of radially extended midportion 90 is adapted to contact the input surface 36 of reduced housing radius 34, thereby preventing the axial movement of actuator 70 towards low pressure area 17 within housing cavity 22.

Outside surface 78 is further preferably provided with a circumferential groove or projection near the discharge end 80 for mating with a similar groove or projection on the adjustment collar 96 to provide a snap fit fixing the adjustment collar to the actuator 70. Any means by which adjustment collar 96 can be fixed to adjust to actuator 70 would be appropriate; however, an arrangement which would allow for a quick and easy snap fit assembly would be preferred.

The seal which is provided by the contact of shoulder 92 with input surface 36 is preferably enhanced by the placement, during assembly, of a flat gasket seal 94 therebetween. The flattened rectangular cross-section of gasket seal 94 is shown in FIG. 4.

Nose piece or adjustment collar 96 includes a cylindrical nose piece cavity 98 which is defined by the inside surface 100 of tubular nose piece wall 102. The diameter of inside surface 100 is adapted to closely receive outside surface 78 of actuator wall 76 therein. That portion of actuator wall 76 which extends past the reduced housing radius 34 of housing 20 is inserted into nose piece cavity 98 during assembly. As discussed above, inside surface 100 is preferably provided with a nubbin or groove 104 to mate with and provide a snap fit of nose piece 96 with a similar nubbin or groove 106 on actuator 70.

Adjustment collar 96 is used by passenger to rotate the actuator 70, and thereby accomplish the axial movement of closure member 40 by the interaction of inward projections 68 and 69 within helical grooves 84 and 85.

Valve 10 is mounted on wall 18 of the air manifold for tilting movement in a 360 degree arc and at an angle of up to 60 degrees off the center axis. As shown in FIGS. 2 and 3, this mounting may include an annular threaded member 114, having a shoulder 116 for receiving wall 18, the threaded member 114 being received over the housing 20 and sealed thereto by an annular sealed element 118 which prevents escape of air around the housing 20 but which permits angular and tilting movement of housing 20 relative to wall 18. To anchor housing 20 in place, a second threaded member 120, shown in cross-section in FIG. 3, is mounted on the interior and screwed into member 114 with an annular seal member 122 therebetween.

In operation, in the closed position as seen in FIGS. 3 and 4, the closure member is in the closed position, sealed by engagement of flange 54 with tapered wall 30. The effectiveness of this seal is demonstrated by the comparatively small leakage of air when tested at pressures of both 5 and 20 inches of water. The windows on closure wall 42 are thus effectively sealed to the flow of air. As the adjustment collar 96 is rotated, the interaction of the helical cam channels 84 and 85 with the inward projections 68 and 69 force the rotatively fixed closure member 40 to be moved axially into the open position shown in FIG. 5 permitting air to flow through the portions of the windows that are uncovered from the high pressure end through the aligned cavities 22, 48, 72, and 98, and into the area occupied by the passenger.

In the embodiment described, the maximum rotation of the adjustment collar 96 and actuator 70 is approximately 180 degrees from the fully closed to the fully opened position, as already noted. However, rotation from 0 degrees to 180 degrees represents effectively an infinite adjustment in that range. The slip between the ball 20 and the socket 114 and/or the slip between the nose 96 and the nozzle 70 prevents excessive application of torque to the nose 96 from damaging the projections 68 and 69.

Comparison testing was conducted with the unit of application Ser. No. 07/721,824 (A), a unit of this invention (B) and several commercial units, (C1), (C2) [from the same manufacturer], and (D) and (E) from two other manufacturers. The names of the manufacturers are not being disclosed for obvious reasons. The data are as follows:

| Specifications Type | A Poppet | B Poppet | C1 BF* | C2, BF* | D N** | E N** |
|---|---|---|---|---|---|---|
| Outlet dia (in) | .925 | .912 | .875 | .875 | .415 | .410 |
| Weight, grams | 26 | 32 | 71 | 71 | 38 | 38 |
| Flow rate | | | | | | |
| @ 5 in H₂O (CFM) | 30.9 | 46.4 | 43.9 | 52.6 | 6.8 | 6.8 |
| @ 20 in H₂O (CFM) | 63.4 | 91.6 | 87.2 | 101.8 | 14.0 | 12.0 |
| Leakage rate | | | | | | |
| @ 5 in H₂O (CFM) | .23 | .19 | .53 | .87 | .07 | *** |
| @ 20 in H₂O (CFM) | .34 | .35 | 1.67 | 1.79 | .46 | *** |
| Noise, straight open, db, 20 in | | | | | | |
| @ 2 in H₂O (CFM) | 81.1 | 69.2 | 91.7 | 93.5 | 52.7 | 50.2 |
| Noise, straight closed, db, 20 in | | | | | | |
| @ 2 in H₂O (CFM) | 45.9 | 46.7 | 47.9 | 46.1 | 47.4 | 48.6 |
| Noise, side open, db, 20 in | | | | | | |
| @ 2 in H₂O (CFM) | 68.1 | 66.1 | 62.5 | 61.6 | 50.5 | 50.7 |
| Noise, side closed, db, 20 in | | | | | | |
| @ 2 in H₂O (CFM) | 47.2 | 46.3 | 48.2 | 49.2 | 49.4 | 48.2 |
| Torque to open/close inch pounds | .154 | .053 | n/d | .057 | n/d | .4 |
| Torque to rotate sphere inch pounds | 1.8 | 1.8 | n/d | 1.0 | n/d | 1.0 |
| Rotation to open full, in degrees | 180 | 180 | 90 | 90 | 180 | 160 |
| Spherical adjustment degrees | 60 | 56 | 60 | 60 | 50 | 50 |
| Mounting method | *t/r | *t/r | *4/b | *t/r | *t/r | *t/r |

*Butterfly,
**Needle
***less than .05 CFM
*t/r = threaded ring,
*4/b = four bolts In addition to the advantages already noted, what these data indicate is that the unit of the present invention is lighter in weight than other commercial units, C1, C2, D and E. This is significant in commercial aircraft where added weight of the aircraft is a material factor. Flow rate and leakage rages are better than most currently commercial units tested. In general these data indicate a marked improvement over the commercially available units tested.

The invention can be used, with minor modifications in some cases, as a control valve unit for virtually any type of fluid, not just air.

The invention is not limited to the specific embodiments described above, but all changes and modifications thereto as are apparent to those skilled in the art and not constituting departure from the spirit and scope of the invention as claimed herein are intended to be included.

What is claimed is:

1. A fluid control valve unit for variably controlling the discharge of fluid from a fluid source, comprising:
   a housing having a wall defining a cavity extending axially therethrough;
   an axially moveable and nonrotatable closure member received for progressive axial and nonrotating movement in said cavity between a closed position and a flow position;
   said closure member including a sealing portion for engagement with said housing to prevent flow of fluid therebetween, an actuation portion for effecting axial movement thereof, and an aperture portion for passage of fluid;
   said closure member being rotatably fixed in said cavity and being axially movable with respect thereto;
   a rotatable and axially non-moveable actuator member in fluid communication with said closure member received for progressive rotating and nonaxial movement in said cavity and including an end extending out of said housing;
   said actuator member having an outer peripheral surface and being located between said closure member and said housing whereby said closure member travels axially over the outer peripheral surface said actuator member during movement between the closed position and the flow position;
   said actuator member being axially fixed in said cavity and being rotatable with respect thereto; said actuator member including cam means on said outer peripheral surface for engaging said actuation portion and operative upon rotation of said actuator member to effect progressive axial movement of said closure member towards and away from the closed position to permit flow of an amount of fluid related to the location of said aperture portion relative to said housing; and
   a portion of said closure member overlying a portion of said actuator in all positions of said valve unit.

2. The fluid control valve as set forth in claim 1 wherein said cam means includes said actuator member, the latter having a helical groove adapted to closely receive said actuation portion for slideable engagement therein.

3. The fluid control valve as set forth in claim 1 wherein said actuation portion includes at least one projection element fixed to said closure member and extending inwardly therefrom; said projection element engaging said cam means.

4. The fluid control valve as set forth in claim 3 wherein said cam means includes said actuator member having a helical groove adapted to closely receive said at least one projection element for slideable engagement therein.

5. The fluid control valve as set forth in claim 1 further including rotation preventing means for preventing rotation of the closure member with respect to said housing.

6. The fluid control valve as set forth in claim 5 wherein said rotation preventing means include:
   at least one projection element fixed to said closure member and extending outwardly therefrom; and,
   receiving means on the inside wall defining said cavity for receiving said projection element therein; said receiving means adapted for allowing said projection element to slide freely along an axis parallel to the longitudinal axis of said cavity; said receiving means adapted for preventing said projection element to rotate with respect to said housing 7. The fluid control valve as set forth in claim 5 wherein said rotation preventing means comprise:
   said wall having a slot aligned parallel to the axis of said cavity; and
   a closure projection fixed to said closure member; said closure projection being aligned parallel to the axis of said cavity and adapted to be closely received in said slot.

8. The fluid control valve as set forth in claim 1 further including axial movement preventing means for preventing the axial movement of said actuator member with respect to said cavity.

9. The fluid control valve as set forth in claim 8 wherein said axial movement preventing means comprise:
   an outwardly extending radial actuator flange fixed to said actuator member;
   a bottom portion of said housing having an inwardly extending radial housing flange that conforms to the shape of the lower surface of said actuator flange, the top surface of said housing flange adapted for tightly mating with the lower surface of said actuator flange,
   an adjustment knob fixed to said end; the bottom surface of said housing flange adapted for tightly mating with said adjustment knob.

10. The fluid control valve as set forth in claim 1 further comprising means for preventing said closure member from moving completely out of said cavity.

11. The fluid control valve as set forth in claim 1 wherein said sealing portion includes:
    a cap portion of said closure member having an outwardly extending radial flange; and,
    a top surface of said housing having a shape that conforms to the shape of the lower surface of said flange, said top surface adapted for tightly mating with the lower surface of said flange.

12. The fluid control valve as set forth in claim 1 further comprising an adjustment knob fixed to said end adapted to be used by a passenger for adjusting said control valve.

13. The fluid control valve as set forth in claim 1 wherein said actuator member further includes sealing means for engagement with said housing to prevent flow of fluid therebetween.

14. The fluid control valve as set forth in claim 13 wherein said sealing means include:
    an outwardly extending radial actuator flange fixed to said actuator member;
    a bottom portion of said housing having an inwardly extending radial housing flange that conforms to the shape of the lower surface of said actuator flange, the top surface of said housing flange adapted for tightly mating with the lower surface of said actuator flange.

15. The fluid control valve as set forth in claim 14 wherein said sealing means further includes an annular seal member between said actuator flange and said housing flange.

16. The fluid control valve as set forth in claim 1 wherein said housing is generally spherically shaped and adapted to be universally pivotable.

17. The fluid control valve as set forth in claim 1 wherein the wall defining said cavity is cylindrical.

18. The fluid control valve as set forth in claim 1 wherein the wall defining said cavity is cylindrical and is axially aligned with said generally spherical housing.

19. A fluid control valve unit for variably controlling the discharge of fluid from a fluid source, comprising:
    a housing having a wall defining a cavity extending axially therethrough;
    an axially moveable and nonrotatable closure member received for progressive axial and nonrotating movement in said cavity;
    said closure member including a sealing portion for engagement with said housing to prevent flow of fluid therebetween, an actuation portion for effecting axial movement thereof, and an aperture portion for passage of fluid;
    said closure member being rotatably fixed in said cavity and being axially movable with respect thereto;
    a rotatable and axially non-moveable actuator member in fluid communication with said closure member and received between said housing and said closure member whereby said closure member is spaced from said housing for progressive rotating and nonaxial movement in said cavity and including an end extending out of said housing;
    said actuator member having an outer peripheral surface and being axially fixed in said cavity and being rotatable with respect thereto;
    said actuator member including a helical groove on said outer peripheral surface and adapted to closely receive said actuation portion for slidable engagement therein, said helical groove engaging said actuation portion and operative upon rotation of said actuator member to effect progressive axial movement of said closure member to permit flow of an amount of fluid related to the location of said aperture portion relative to said housing;
    rotation preventing means for preventing rotation of the closure member with respect to said housing;
    axial movement preventing means for preventing the axial movement of said actuator member with respect to said cavity;
    said actuator member further including sealing means for engagement with said housing to prevent flow of fluid therebetween; and
    a portion of said closure member overlying a portion of said actuator in all positions of said valve unit.

20. A fluid control valve unit for variably controlling the discharge of fluid from a fluid source, comprising:
- a housing having a wall defining a cavity extending axially therethrough;
- said housing being generally spherically shaped and adapted to be universally pivotable;
- the wall defining said cavity being cylindrical and axially aligned with said generally spherical housing;
- an axially moveable and nonrotatable closure member received for progressive axial and nonrotating movement in said cavity;
- said closure member including a sealing portion for engagement with said housing to prevent flow of fluid therebetween, at least one finger element fixed to said closure member and extending inwardly therefrom adapted to effect axial movement of said closure member, and an aperture portion for passage of fluid;
- said closure member being rotatably fixed in said cavity and being axially movable with respect thereto;
- a rotatable and axially non-moveable actuator member in fluid communication with said closure member received in said housing and including a portion received in said closure member for progressive rotating and nonaxial movement in said cavity and including an end extending out of said housing;
- said actuator member having an outer peripheral surface and being axially fixed in said cavity and being rotatable with respect thereto;
- said actuator member including a helical groove in the outer peripheral surface and adapted to closely receive said at least one finger element for slidable engagement therein, said helical groove engaging said finger element and operative upon rotation of said actuator member to effect progressive axial movement of said closure member to permit flow of an amount of fluid related to the location of said aperture portion relative to said housing;
- at least one projection element fixed to said closure member and extending outwardly therefrom;
- receiving means on the inside wall defining said cavity for receiving said projection element therein;
- said receiving means adapted for allowing said projection element to slide freely along an axis parallel to the longitudinal axis of said cavity;
- said receiving means adapted for preventing said projection element to rotate with respect to said housing;
- an outwardly extending radial actuator flange fixed to said actuator member;
- a bottom portion of said housing having an inwardly extending radial housing flange that conforms to the shape of the lower surface of said actuator flange, the top surface of said housing flange adapted for tightly mating with the lower surface of said actuator flange;
- an adjustment knob fixed to said end;
- the bottom surface of said housing flange adapted for tightly mating with said adjustment knob; said adjustment knob adapted to be used by a passenger for adjusting said control valve;
- a cap portion of said closure member having an outwardly extending radial flange;
- a top surface of said housing having a shape that conforms to the shape of the lower surface of said flange, said top surface adapted for tightly mating with the lower surface of said flange,
- an outwardly extending radial actuator flange fixed to said actuator member;
- a bottom portion of said housing having an inwardly extending radial housing flange that conforms to the shape of the lower surface of said actuator flange, the top surface of said housing flange adapted for tightly mating with the lower surface of said actuator flange;
- an annular seal member between said actuator flange and said housing flange; and
- a portion of said closure member overlying a portion of said actuator in all positions of said valve unit.

* * * * *